United States Patent
Ringwall et al.

[15] 3,672,388
[45] June 27, 1972

[54] SENSOR AND CONTROL SYSTEM FOR CONTROLLING GAS PARTIAL PRESSURE

[72] Inventors: Carl G. Ringwall, Scotia; Rasik P. Shah, Schenectady, both of N.Y.

[73] Assignee: General Electric Company

[22] Filed: June 19, 1969

[21] Appl. No.: 834,718

[52] U.S. Cl................137/88, 137/81.5, 73/32, 331/155
[51] Int. Cl..................G01n 9/24, G05d 11/16
[58] Field of Search.........137/81.5, 88, 91; 73/23.1, 73/32, 339; 331/18, 23, 36, 155, 64; 324/33

[56] References Cited

UNITED STATES PATENTS

| | | | |
|---|---|---|---|
| 3,569,825 | 3/1971 | Lillienfeld | 324/33 |
| 2,949,166 | 8/1960 | Coleman et al. | 331/155 X |
| 3,273,377 | 9/1966 | Testerman et al. | 137/81.5 X |
| 3,318,152 | 5/1967 | Thompson et al. | 73/339 X |
| 3,377,840 | 4/1968 | Cole, Jr. | 73/32 |
| 3,412,745 | 11/1968 | Kelley | 137/81.5 |
| 3,532,102 | 10/1970 | Glassey | 137/91 |

Primary Examiner—William R. Cline
Attorney—Joseph B. Forman, Frank L. Neuhauser, Oscar B. Waddell, David M. Schiller and Arthur E. Fournier

[57] ABSTRACT

A sensor consisting of two electro-fluidic delay line oscillators generates a signal for controlling the partial pressure of a first gas in a multi-gas mixture. A sealed delay line of the first oscillator is filled with a known gas and functions as a reference oscillator. An apertured delay line of the second (sensing) oscillator is immersed in the gas mixture and the first gas flow thereto is controlled to obtain the sensing oscillator frequency equal to the reference frequency. Any difference frequency is proportional to the deviation of the actual first gas concentration from a predetermined value. A change in the partial pressure of the first gas, due to an environmental change, is compensated for by a predetermined change in the length of the sensing oscillator delay line and control of the first gas flow to regain the equal frequency condition.

18 Claims, 6 Drawing Figures

PATENTED JUN 27 1972 3,672,388

Inventors:
Carl G. Ringwall,
Rasik P. Shah,
by Louis A. Moncha

Inventors:
Carl G. Ringwall,
Rasik P. Shah,
by Louis A. Moucha

Inventors:
Carl G. Ringwall,
Rasik P. Shah,
by Louis A. Moucha

SENSOR AND CONTROL SYSTEM FOR CONTROLLING GAS PARTIAL PRESSURE

Our invention relates to a partial pressure gas sensor and control system, and in particular, to a sensor and system utilizing two electro-fluidic delay line oscillators for sensing the partial pressure of a particular gas in a multi-gas mixture. The invention herein described was made in the course of or under a contract or subcontract thereunder, with the Department of the Navy.

The gas ratio sensor is important in many applications wherein the composition of a gaseous environment is critical, such as deep sea diving apparatus and various industrial and space applications where leakage of a potentially hazardous gas to the ambient environment must be detected. Various devices have been proposed, or are in use, as gas ratio sensors for sensing the partial pressure of a particular gas in a multi-gas mixture. However, these prior art devices are not entirely satisfactory due to their restriction to applications where the ambient temperature is constant and the like. These limitations cannot be tolerated in an application such as deep sea diving apparatus wherein the ambient temperature varies considerably with diving depth.

Therefore, one of the principal objects of our invention is to provide a gas ratio sensor utilizing two delay line oscillators for sensing the partial pressure of a particular gas in a multi-gas mixture.

Another object of our invention is to provide the sensor utilizing delay line oscillators of the electro-fluidic type.

Another object of our invention is to provide a control system utilizing the sensor for controlling the partial pressure of the particular gas at desired value thereof.

A further object of our invention is to provide a sensor and system for controlling the partial pressure of oxygen in the inhale bag of deep sea diving apparatus operating on a helium and oxygen gas mixture.

Briefly summarized, our invention includes a gas ratio sensor consisting of two electro-fluidic delay line oscillators wherein the first oscillator generates a reference frequency signal and the second oscillator generates a frequency signal corresponding to the actual (sensed) partial pressure of a first gas in a multi-gas mixture. The fluidic delay line of the reference oscillator is a sealed tube of fixed length and filled with a known gaseous medium. The delay line of the sensing oscillator is open to the multi-gas mixture being monitored and the frequency of pneumatic pressure waves generated therein is dependent on the tube length and gas constant of the multi-gas mixture. The frequency signals generated in the two oscillators are compared in a beat frequency detector, and any difference frequency is proportional to the deviation of the first gas partial pressure from a desired value thereof. The desired value of the first gas partial pressure is maintained in the presence of an environmental change which would vary such partial pressure, by predetermined change in the length of the sensing oscillator delay line and control of flow of the first gas to the region wherein the reference and sensing oscillators are disposed to thereby reduce the difference frequency to zero or near zero.

The features of our invention which we desire to protect herein are pointed out with particularity in the appended claims. The invention itself, however, both as to its organization and method of operation, together with further object and advantages thereof, may best be understood by reference to the following description taken in connection with the accompanying drawings wherein:

Figure 1:
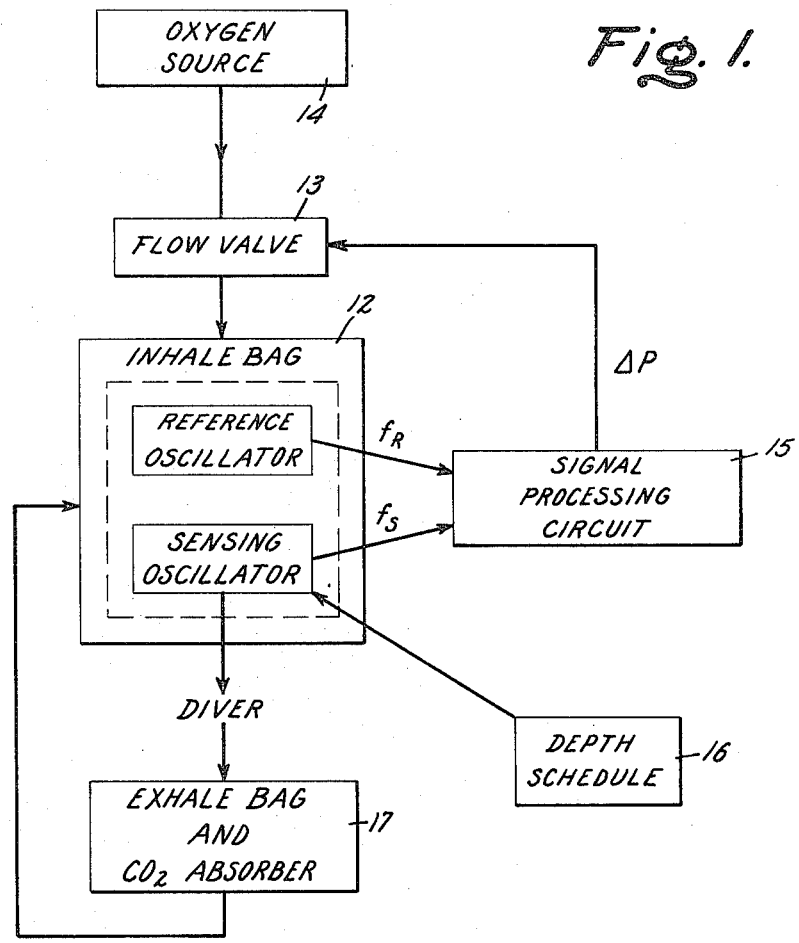
FIG. 1 is a simplified block diagram of a system for controlling the partial pressure of oxygen in the inhale bag of deep sea diving apparatus.

Referring now in particular to FIG. 1, there is shown a block diagram of our partial pressure gas sensor and the essential features in a particular system for controlling the partial pressure of oxygen in a deep water diving application. Obviously, our invention is not limited to the sensing and control of the partial pressure of oxygen but is adapted for sensing and controlling the partial pressure of virtually any gas in a multi-gas mixture.

Typical operating conditions of long duration deep water diving require a mixture of oxygen and helium ($O_2 - H_e$) wherein the ratio must be controlled to maintain a relatively constant partial pressure of oxygen, regardless of diving depth. Since the working depth of the diver frequently changes, changes are required in both total gas pressure and percent $O_2$ by volume pressure to maintain the constant partial pressure of oxygen. Further, the temperature may vary in the range + 35 to + 95° with rapid changes as much as 30° possible. A convenient gas mixture sensor (i.e. partial pressure gas sensor) for such application is an electro-fluidic oscillator whose frequency output is sensitive to the oxygen content in the gas mixture. The subject invention sensor includes a sensing oscillator utilizing an open fluidic delay line of the type disclosed and claimed in concurrently filed, copending patent application 834,840, now U.S. Pat. No. 3,621,453, inventors Carl G. Ringwall and Salvatore Bottone, Jr. and assigned to the assignee of the present invention. The frequency "$f$" of oscillation in such electro-fluidic delay line oscillator is $$f = \frac{n(\gamma R T)^{\frac{1}{2}}}{2L}$$

a function primarily of the delay line length $L$, absolute gas temperature $T$, and the gas constant $R$ of the particular gaseous medium in the delay line. The electro-fluidic delay line oscillator is especially well adapted for deep water diving applications since it becomes increasingly sensitive with greater differences of gas constants of the two gases in the mixture, and in the case of an $O_2 - H_e$ mixture, the gas constant of helium is 386 and that of oxygen is 48.3.

Figure 6:
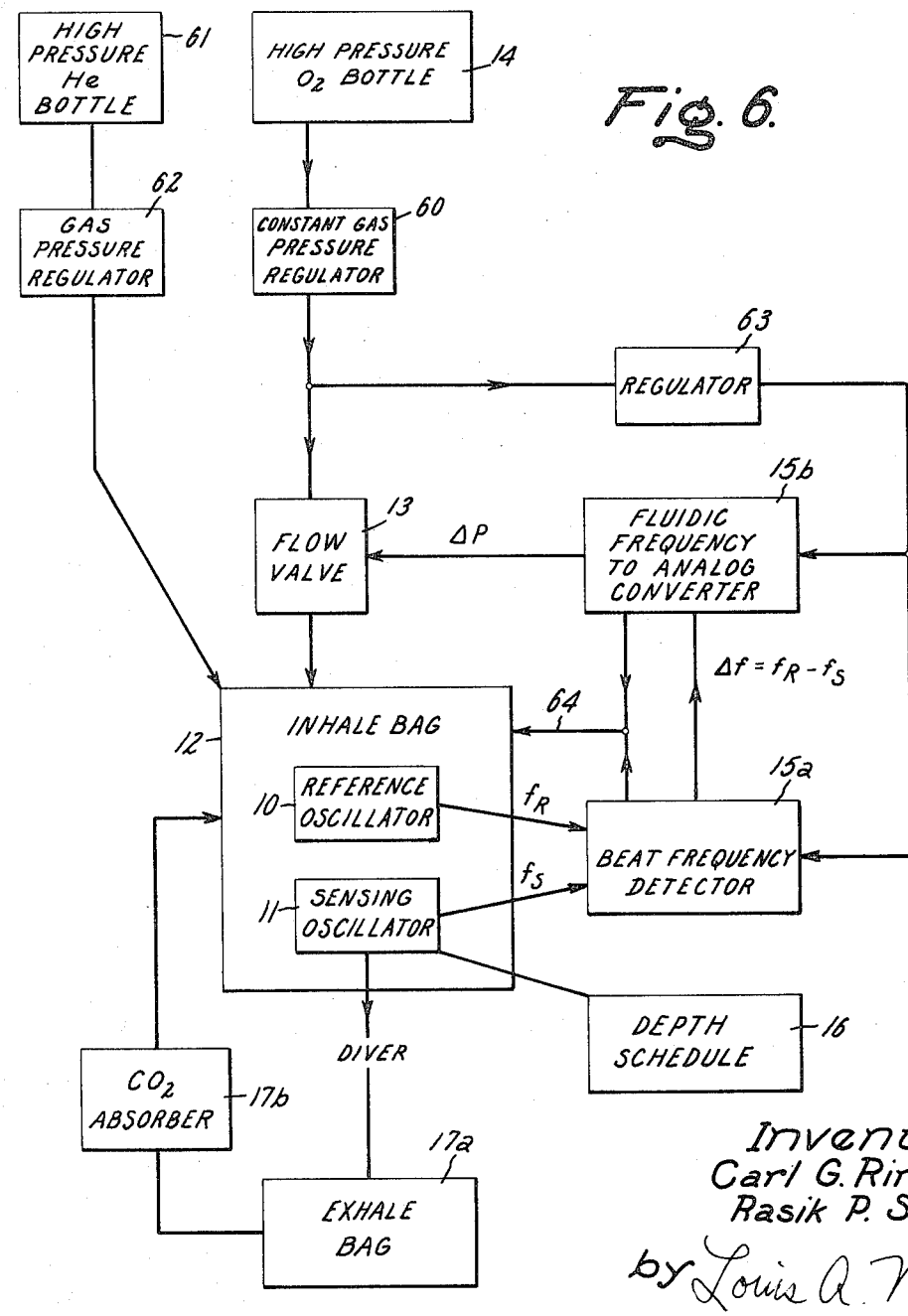
FIG. 6 is a more detailed block diagram of the system in FIG. 1.

Since such oscillator is temperature-sensitive, compensation for temperature effects is provided in accordance with our invention by utilizing a second (reference) oscillator of the same type, operating in the same environment as the sensing oscillator, but including a sealed fluidic delay line of fixed length such that any change in its oscillation frequency is dependent only upon change in the temperature of the environment. Thus, our partial pressure gas sensor comprises a reference oscillator 10, a sensing oscillator 11 and a beat frequency detector for sensing any difference between the two frequencies $f_R$ and $f_S$ generated by the respective oscillators. The two oscillators, each of the electro-fluidic delay line type, are contained within the particular gaseous environment wherein the partial pressure of one of a two-gas mixture is to be sensed and controlled. At equal frequency conditions $f_R = f_S$, the ratio of the two delay line lengths corresponds to a particular ratio of the fixed gas constant of the gas in the sealed tube and the variable gas constant of the gas in the open delay line, and therefore, corresponds to a particular partial pressure of a first gas in a two-gas mixture. In the particular application of a deep water diving system, the gaseous environment is the interior of the inhale bag 12 of the diver's equipment and the particular gaseous medium is an $O_2 - H_e$ mixture wherein the partial pressure of the oxygen is to be sensed and controlled for maintenance at a relatively constant partial pressure of approximately 175 mm Hg regardless of the water depth. The output of the beat frequency detector may be employed directly by the diver as a signal for manual adjustment of a conventional flow valve 13 connected between the oxygen source 14 and inhale bag. Thus, the output of the beat frequency detector may be connected to a suitable transducer whereby the diver detects the beat frequency and manually adjusts valve 13 to reduce such beat frequency to zero or near zero. The frequency signal from the outputs of oscillators 10 and 11 may, of course, be processed in a suitable signal processing circuit 15, to be described hereinafter, which includes circuitry in addition to the beat frequency detector for developing a pressurized fluid signal $\Delta P$ proportional to the difference frequency $f_R - f_S$ (i.e. difference between a desired gas mixture and the actual mixture in inhale bag 12) for automatic adjustment of flow valve 13 in a closed loop circuit thereby automating the partial pressure control as indicated in FIGS. 1 and 6.

Figure 2:
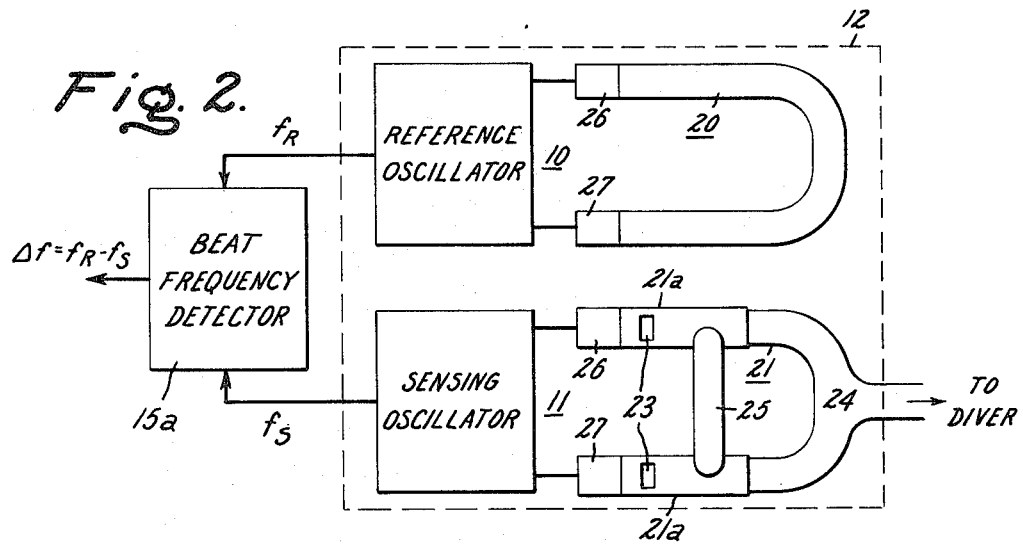
FIG. 2 is a combined schematic-block diagram of the oxygen partial pressure sensor in the system of FIG. 1.

A preferred embodiment of our partial pressure gas sensor is illustrated in FIG. 2 wherein the reference oscillator 10 is an electro-fluidic delay line oscillator having a sealed fluidic delay line 20 of known fixed length, and sensing oscillator 11 is an electro-fluidic delay line oscillator having a delay line 21 of adjustable length and provided with means 23, 24 for passage of the two-gas mixture therethrough. During a typical inhale-exhale cycle, the gas mixture in the inhale bag enters the sensing oscillator delay line 21 through apertures 23 and exits through the center section 24 to the diver's face mask (see FIG. 2). The diver's exhale gas goes to the exhale bag 17 and returns to the inhale bag through a $CO_2$ absorber. Each oscillator, as described in detail in the aforementioned concurrently filed patent application to Ringwall and Bottone, Jr., includes a delay line in the form of a rigid tubing, electrical-pneumatic transducers 26, 27 at opposite ends thereof for converting the signals to proper form, and an electronic amplifier for providing sufficient gain to maintain self-sustained oscillation in the loop comprising the delay-line, transducers and electronic amplifier. The frequency output output signals of oscillators 10 and 11 are in electrical form in our preferred embodiment, although such signals may be in fluidic form for the case wherein the oscillators are of the all-fluidic type. The beat frequency detector 22 is of the electronic type in our preferred embodiment (although it would be fluidic in the case wherein the oscillators are all-fluidic) and is provided with a suitable electrical-to-pneumatic transducer for converting the difference frequency output signal $\Delta f = f_R - f_S$ to pneumatic form. The electrical supply for the transducers, beat frequency detector and electronic amplifiers is a low voltage battery (not shown) in the 6 to 12 volt range. The electronic amplifiers in the reference and sensing oscillator circuits each include an appropriate band pass filter wherein the mid-band frequency thereof is tuned to the oscillator reference frequency to thereby determine the frequency mode ("$n$" integer) of the circuit oscillation as described in the referenced application to Ringwall and Bottone, Jr.

In the more general application of our partial pressure gas sensor and control system, the gaseous medium within the sealed tube 20 may be any known single gas or multi-gas (two or more) mixture, and in the case of a two-gas mixture it may be the same as, or different from, the two-gas mixture in, and surrounding the sensing tube 21. The gas in sealed tube 20 is pressurized to the highest anticipated pressure for the sensor environment.

Our gas sensor is not limited to monitoring a first gas in only a two-gas mixture, and has application in a mixture of any number of gases wherein the other gases and their concentrations are known. Theoretically, of course, our sensor is operable as long as there is any difference between the gas constants of the monitored gas and other gases in the mixture. However, for practical considerations of satisfactory sensor sensitivity, the gas constant of the monitored gas should be sufficiently different from the other gases. It should be understood that the sensor sensitivity is also a function of the gas concentrations, and increases as the concentration (by percent volume or partial pressure) of the monitored gas increases relative to the other gas concentrations. Thus, our sensor and control system is adapted for sensing and controlling the partial pressure of a particular gas in a multi-gas mixture which may include two, three or more gases. The sealed tube of the reference oscillator may contain one or more known gases, including any or all of the gases passing through the open tube of the sensing oscillator. The particular gas or gases in the sealed tube is often governed by the particular application.

In operation, the fluidic delay line in each oscillator is excited at a first end through electrical-to-pneumatic transducer 26 to produce corresponding frequency pneumatic pressure signals thereat, and these signals are sensed by a pneumatic-to-electrical transducer 27 at the other end. The signal produced in the reference delay line 20 is of frequency $$f_R = \frac{n\sqrt{(\gamma R)_r T}}{2L_r}$$

where the tube length $L_r$, frequency mode $n$, and gas constant factor $(\gamma R)_r$ are constant, and temperature $T$ is variable. In the case of the sensing delay line 21, the signal produced is of frequency $$f_S = \frac{n\sqrt{(\gamma R)_s T}}{2L_s}$$

where only $n$ is constant. Since both frequency signals $f_R$ and $f_S$ vary identically with temperature, and both delay lines are immersed in the same multi-gas mixture environment, the sensor is temperature-compensated and no errors are introduced due to temperature changes in the gaseous environment. In like manner, the sensor circuit external of the delay lines, including transducers, electronic amplifiers and filters should provide zero or n multiples of 180° phase shifts, however, phase shifts other than zero or 180° do not cause an error if the same phase shift occurs in both the sensing and reference oscillators. Our sensor is actually capable of determining a gas partial pressure by detection of the phase lag or frequency difference between the two signals produced in the delay lines, but the discussion will be primarily directed to the frequency difference technique.

As evident from the above equations, variations in the phase lag or difference frequency between signals $f_R$ and $f_S$ depend on the variables, gas property $(\gamma R)_s$ and delay line length $L_s$ in the $f_S$ equation. A schedule must be established, prior to the use of our sensor and system, for the delay line length $L_s$ versus known variable conditions of the multi-gas mixture environment in which the delay lines are immersed for a constant desired partial pressure of the particular gas being controlled. The sensor and system is then operated in the following manner, further details of the oscillator operation being provided in the referenced application to Ringwall and Bottone, Jr. Assuming the sensor is operating in a first known condition of the gaseous environment, the delay line 21 length is adjusted in accordance with the schedule. If the desired partial pressure of the particular gas is present in the environment, the two frequencies $f_R$ and $f_S$ are equal or near equal; if the desired partial pressure is not present, the two frequencies are unequal and a flow of the particular gas to the environment must be controlled (manually or automatically) to achieve the zero or near zero difference frequency condition. Upon a change in the environment to a second known condition, the delay line 21 length is adjusted accordingly, thereby changing frequency $f_S$ (and assuming constant temperature $T$ of the environment for sake of simplicity, then frequency $f_R$ remains constant). The flow of the particular gas must again be controlled to achieve the $f_S = f_R$ condition which obtains the desired value of partial pressure of the particular gas.

Figure 3:
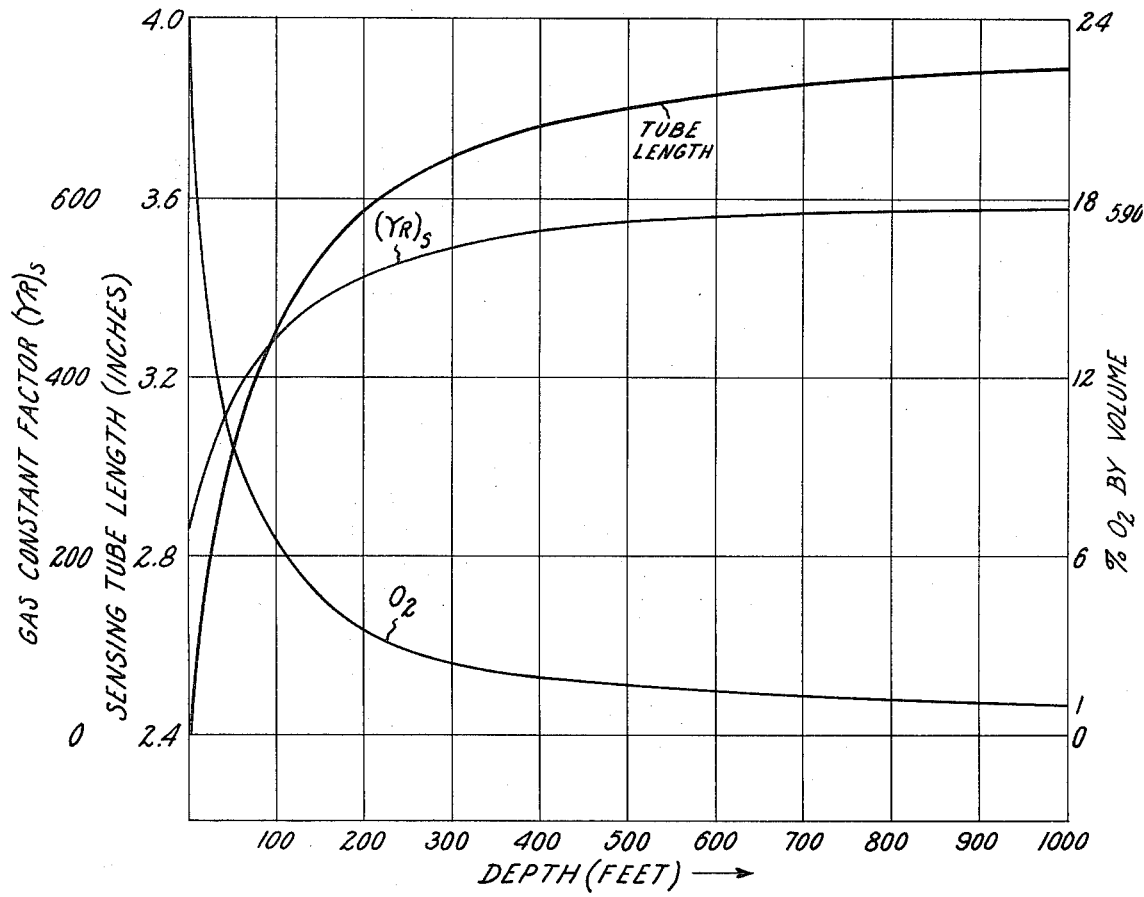
FIG. 3 is a graphical representation of various parameters of our partial pressure sensor versus diving depth.

In the specific embodiment of a partial pressure oxygen sensor for deep water diving applications, sealed tube 20 contains helium gas pressurized at the predetermined maximum operating depth for the deep water diving system, and sufficient encapsulated water to saturate the helium gas at any operating temperature and thereby provide 100 percent relative humidity over the entire temperature range of operation. The reference oscillator thus provides compensation for the effects of temperature and moisture on the sensing oscillator. Apertures 23 in sensing oscillator delay line 21 are located near both ends thereof, and the center section 24 is open and connected to the diver's face mask. The depth schedule 16 (known environment conditions of the $O_2 - H_e$ mixture) in FIG. 1 comprises a depth gage and corresponding scale of the delay line 21 length for a particular constant partial pressure of oxygen. A particular depth schedule for 4 inch long delay lines 20, 21 and the condition of constant partial pressure of oxygen of 175 mm Hg is illustrated in FIG. 3 by curve "tube length". This curve is also based on the reference conditions of partial pressure of water vapor of 16 mm Hg (corresponding to saturation temperature of 65°F), zero partial pressure of $CO_2$ and a temperature of 65°F. The variation of the required percent by volume of oxygen in the $O_2 - H_e$ mixture in the inhale bag, and the equivalent gas constant factor $(\gamma R)_s$ for the $O_2 - H_e$ mixture, versus diving depth for the condition of constant 175 mm $H_g$ partial pressure of oxygen is also illustrated in FIG. 3 by curves "$O_2$" and "$(\gamma R)_s$", respectively. Thus, a desired $O_2 - H_e$ gas mixture in the inhale bag is established by adjustment of the delay line 21 length by means of control member 25 in accordance with the known diving depth and the depth schedule (curve "tube length" in FIG. 3), and manual or automatic regulation of valve 13 to obtain a zero or near zero difference frequency signal at the output of beat frequency detector 15a in the signal processing circuit 15. A change in the diving depth (environment) varies the oxygen partial pressure from the desired level of 175 mm Hg since the helium flow to the inhale bag is varied to obtain a total pressure in the inhale bag approaching the outside (environment) water pressure, i.e., the equivalent gas constant factor $(\gamma R)_s$ varies with the helium partial pressure due to the relative values of the individual gas constants of helium and oxygen. The equivalent specific heat term $\gamma$ portion of factor $(\gamma R)_s$ varies only slightly with diving depth, and it is the equivalent gas constant term $R$ which varies significantly therewith.

Now, assume that the change in diving depth is an increased depth, it being recognized that operation in a change to a decreased depth is analogous to the following explanation. With an increased depth, the pressure of the outside water (environment) increases, and the helium flow must be increased to increase the total pressure in the inhale bag to a magnitude approaching the outside water pressure. It can be seen from the $O_2$ curve in FIG. 3 that the oxygen portion of the $O_2 - H_e$ mixture decreases rapidly over the first 100 feet of depth and then continues to decrease slowly with increasing depth in a range from approximately 7 to 2 percent by volume. Thus, since the oxygen portion (by volume) of the mixture decreases with increasing depth, it is evident that the resultant equivalent gas constant factor $(\gamma R)_s$ for the $O_2 - H_e$ mixture increases toward the value of $\gamma R$ for 100 percent helium with increasing depth as seen from the $(\gamma R)_s$ curve in FIG. 3. Assuming that the outside water temperature is not varying with increased depth (and even if it is, the sensor is temperature-compensated due to the two-oscillator circuit), it follows that the reference frequency $f_R$ remains constant but the gas constant factor $(\gamma R)_s$ increases thereby increasing the sensing frequency $f_S$. Thus, the sensing oscillator delay line length $L_s$ must be increased in accordance with the curve "tube length" in FIG. 3. At this condition of increased (correct) length $L_s$, the frequencies $f_R$ and $f_S$ will be equal when the partial pressure of $O_2$ is 175 mm Hg and the total pressure of the $H_e - O_2$ mixture is equal to the water pressure at the corresponding depths. The oxygen in the inhale bag is being continuously depleted by the diver's demand, thus, valve 13 must be opened further manually or automatically by signal GP to increase the make-up $O_2$ flow to the bag to maintain the partial pressure of $O_2$ at 175 mm Hg.

Due to the delay line lengths in each of the oscillators being held constant for a particular operating depth, the sensing oscillator generates a frequency signal $f_S$ proportional to the inhale gas mixture and ambient (inhale bag) temperature whereas the reference oscillator frequency $f_R$ is dependent only upon the ambient temperature. In a condition when the frequencies $f_R$ and $f_S$ are equal, the diver is obtaining the desired supply of oxygen at reference conditions. At any other temperature or $CO_2$ content, deviation from the desired partial pressure of oxygen occurs; however, since both of the oscillators are located in the inhale bag, the temperature effect and associated humidity (vapor pressure) effects are eliminated and this particular deviation from desired oxygen partial pressure is due only to the presence of undesired ($CO_2$) gases in the inhale gas mixture.

The advantages of our partial pressure gas sensor and control system are (1) the capability of measuring the instantaneous gas concentration in the diver's inhale bag, the sensing operation is completed over one breathe interval and this fast response permits coupling of the sensor into a control system, (2) all of the gas breathed by the diver is sampled rather than merely only a portion thereof, (3) the sensing principle inherently averages the oxygen gas concentration being inhaled by the diver, (4) the frequency format of the sensor signal is desirable from the standpoint of maximizing the signal-to-noise ratio and minimizing drift and bias effects whereby the measurement, monitoring and transmission of the sensor signal is facilitated, (5) the delay line of the sensing oscillator is open-ended, thus allowing rapid purging of the delay line which eliminates any dead gas pockets in the inhale path and the oscillator frequency is thus a true measurement of the gas mixture inhale by the diver, (6) the dual oscillator approach eliminates temperature errors as well as errors due to varying water vapor concentration in the diver face mask, (7) the delay line portion of the sensor is small in size, weighs approximately one ounce, and can be packaged in a volume of approximately $1 \times 1 \times 1\frac{1}{2}$ inches whereby the sensor yields a package configuration and size compatible with the inhale bag geometry, (8) the partial pressure of oxygen is controlled to a desired value of 175 mm Hg to depths of 1,000 feet with a maximum error of ± 10 percent, greater operating depths are possible providing the depth and depth schedule are known and the sensing oscillator delay line is of sufficient length for mechanization of the depth schedule.

Figure 4:
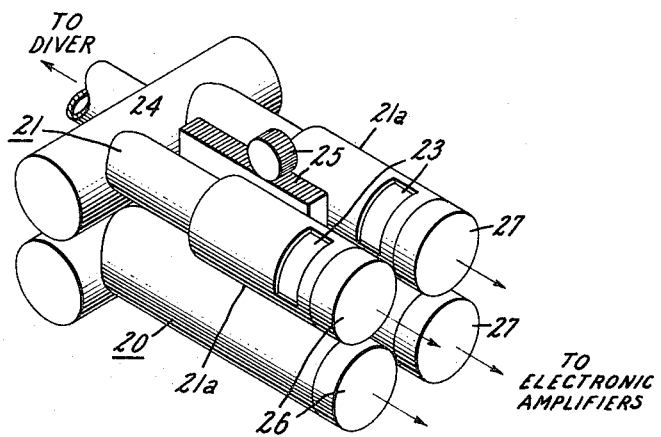
FIG. 4 is a perspective view of the delay line and transducer portion of the sensor illustrated in FIG. 2.

The delay line and transducer portion of our partial pressure gas sensor is illustrated in FIG. 4. The delay lines are fabricated of ⅝ inch diameter stainless steel tubing. The use of high operating frequencies permits the use of short delay line lengths whereby a required length variation can be kept within manageable limits for both manual and automatic adjustment of the length. For the depth schedule illustrated in FIG. 3 wherein the maximum delay line 21 length is 4 inches, the "$n$" mode of operation (i.e., the oscillation frequency) is such that the pneumatic pressure standing waves generated in sensing delay line 21 have pressure nodes occurring approximately at the center and near the two ends of the delay line (the wave occupies six wavelengths in the tube, "$n$" = 12) whereby apertures 23 and open center 24 of delay line 21 have negligible effects on sensor operation. Using an acoustic velocity range of 3,100 to 3,300 feet per second, the frequency range is 55 to 60 kHz. Thus, with the reference oscillator delay line length fixed at 4 inches, the total change in the sensing delay line length required for a depth schedule of 0 to 1,000 feet is approximately 1 ¼ inches, which for a U-tube configuration is a total travel of approximately five-eighths inch. The length of delay line 21 is varied by adjustment of the rack and pinion gear combination 25 which causes a telescoping of the transducer ends 21a of the delay line. Obviously, many other mechanical devices may be employed for adjusting the length of delay line 21. An automatic device (not shown) for regulating the length of delay line 21 comprises a sealed bellows located in the inhale bag which changes its length as a function of depth. One end of the bellows is pinned and the other end connected to a cam contoured to provide the desired depth schedule. A spring-loaded follower on the cam transmits the depth schedule from the cam to the telescopic section of the delay line for changing the effective length thereof.

Figure 5:
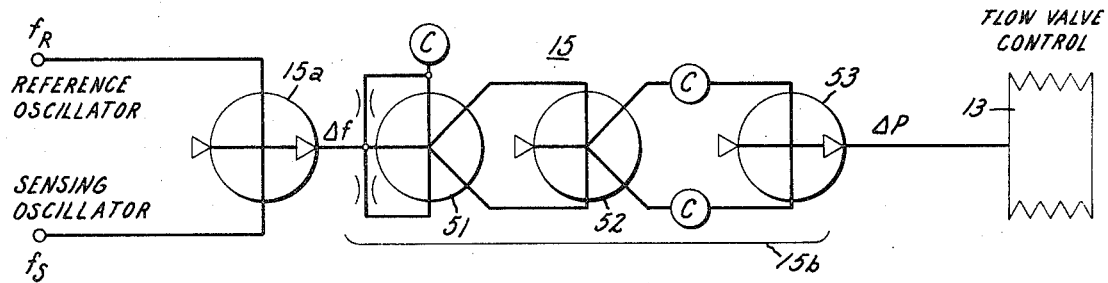
FIG. 5 is a schematic representation of an all-fluidic embodiment of the signal processing circuit in FIG. 1.

Referring now to FIG. 5, there is shown an all-fluidic signal processing circuit 15 adapted for use with oscillator output frequency signals is fluid form. Circuit 15 can be employed with all-fluidic oscillator circuits, or the electro-fluidic oscillators with suitable transducers for converting the electrical frequency signals to fluid form. All-fluidic oscillators are generally not satisfactory for deep water diving applications due to their sensitivity to power fluid supply pressure variation (especially at low supply pressures which introduces an undesirable phase lag), required high power fluid supply pressures (not available in the inhale bag) or high gas consumption. Finally, state of the art all-fluidic oscillator circuits do not operate at the relatively high 60 kHz frequency desired for the subject sensor and therefore electro-fluidic oscillator circuits utilizing electronic amplifiers are more suitable. The preferred sensor and near zero phase lag operation of the oscillator circuits external of the delay line would require an operating frequency for all fluidic amplifiers in the range of approximately 1 kHz which frequency limitation would require excessively long delay line lengths in the order of 2 feet thus making mechanization of the depth schedule difficult. The requirements of high gain, accuracy and controlled phase shift in a narrow high frequency band is easily met in a conventional electronic amplifier or electronic gain block which can be very compact and designed to operate from the low voltage battery supply. The two electronic amplifiers or gain blocks (not shown) occupy a volume of approximately 2 × 2 × 1 inch and the total electrical power dissipated in the amplifiers and transducers is less than 0.5 watt. The gain of the electronic amplifier is approximately $4.4 \times 10^5$ and the centerline frequency of the band pass filters associated therewith is 57.5 kHz for the sensor embodiment herein described. The amplifier-band pass filter components can be located either inside or outside the inhale bag, the only disadvantage being that such approach requires electrical-to-pneumatic transducers at the interfaces. The characteristics of the transducers, which may be of the conventional piezoelectric ceramics and magneto restrictive types, determine the gain requirements of the electronic amplifier network.

Referring now to the details of the FIG. 5 circuit, the two oscillator frequency signals $f_R$ and $f_S$ are summed in a fluidic rectifier 15a which functions as a beat frequency detector, and the difference frequency signal $\Delta f = f_R - f_S$ at the single receiver output thereof is applied to a fluidic frequency-to-analog converter circuit 15b comprising a decoupling amplifier 51, a flip-flop 52 and an output rectifier 53. This converter circuit is described in detail in U.S. Pat. Nos. 3,400,729, Boothe and 3,409,032 Boothe et al., assigned to the assignee of the present invention. The output of rectifier 53 is an analog signal $\Delta P$ of pressure magnitude directly proportional to the difference frequency $f_R - f_S$. The analog output signal of rectifier 53 operates the control element of flow valve 13 to thereby automatically control the oxygen make-up flow from source 14 to inhale bag 12 to maintain the 175 mm Hg partial pressure of oxygen as indicated by the difference frequency being zero or near zero.

FIG. 6 illustrates a more detailed embodiment of the oxygen partial pressure gas control system illustrated in FIG. 1. In particular, the oxygen source 14 is a high pressure oxygen bottle, and a gas pressure regulator 60 maintains the oxygen pressure at a relatively constant magnitude of approximately 200 psig. The helium source (not shown in FIG. 1) is a high pressure helium bottle 61 and includes a gas pressure regulator 62 for maintaining a relatively constant helium pressure of less than 1 psig which is introduced to the inhale bag 12. The $CO_2$ absorber 17b is illustrated as a separate component from the exhale bag 17a and conventionally includes a charcoal material for absorbing the $CO_2$ gas inhaled by the diver. A third gas pressure regulator 63 is connected to the output of regulator 60 for reducing the oxygen pressure to approximately 10 psig as the power fluid supply pressure to the fluid amplifiers in the fluidic frequency-to-analog converter 15b and the electrical-to-pneumatic transducer at the output of the electronic beat frequency detector 15a in the signal processing circuit. In the case wherein the beat frequency detector 15a is also of the fluidic type, the output of regulator 63 would also supply the power fluid thereto. Regulators 60, 62 and 63 are each conventional constant gas pressure regulators. Any oxygen vented from the fluid amplifier elements in the signal processing circuit can be used as part of the make-up oxygen as indicated by interconnection 64 to the inhale bag, it being understood that such signal processing circuit may be included within the inhale bag and therefore not require an external passage 64.

It is apparent from the foregoing that our invention attains the objectives set forth in that it provides a gas ratio or partial pressure gas sensor utilizing two electro-fluidic delay line oscillators for sensing the partial pressure of a particular gas in a multi-gas mixture. Further, the partial pressure gas sensor is embodied in a system for controlling the partial pressure to maintain a desired value thereof, and as one particular example, a deep water diving apparatus system is described operating on a helium-oxygen gas mixture in which the oxygen partial pressure is controlled.

What we claim as new and desire to secure by Letters Patent of the United States is:

1. A partial pressure gas sensor comprising
   first oscillator means for generating a reference frequency signal of frequency dependent on the temperature of a known gaseous medium,
   second oscillator means for generating a second frequency signal of frequency dependent on the temperature of a multi-gas mixture and the partial pressure of a first gas in the multi-gas mixture, said first and second oscillator means immersed in the multi-gas mixture whereby the sensor is compensated for variations in the frequency of the signals generated by said first and second oscillator means due to temperature variations of the multi-gas mixture,
   means for detecting any difference frequency between the reference and second frequency signals wherein the difference frequency is proportional to the deviation of the partial pressure of the first gas in the multi-gas mixture from a desired value thereof, and
   means for varying the frequency of said second oscillator means as a known function of the environmental condition of the multi-gas mixture.

2. The partial pressure gas sensor set forth in claim 1 and further comprising
   means for controlling the frequency of said second oscillator means in the case of a change from a first known environmental condition of the multi-gas mixture to a second known environmental condition wherein the change in environmental conditions results in a change in the partial pressure of the first gas of the multi-gas mixture from the desired value.

3. The partial pressure gas sensor set forth in claim 1 and further comprising
   means for containing said first and second oscillator means to maintain them immersed in the multi-gas mixture, and
   means for controlling a flow of the first gas of the multi-gas mixture to said containing means as a function of the difference frequency for reducing the difference frequency to zero or near zero and thereby controlling the partial pressure of the first gas at the desired value.

4. The partial pressure gas sensor set forth in claim 1 and further comprising
   means for containing said first and second oscillator means to maintain them immersed in the multi-gas mixture, and
   means for controlling a flow of the first gas of the multi-gas mixture to said containing means as a function of the difference frequency for automatically reducing the difference frequency to zero or near zero and thereby controlling the partial pressure of the first gas at the desired value.

5. The partial pressure gas sensor set forth in claim 1 wherein
said first and second oscillator means respectively comprise first and second electro-fluidic delay line oscillators wherein the reference and second frequency signals are in pneumatic pressurized form in the fluidic delay line portions thereof and are in electrical form in the electrical portions thereof.

6. The partial pressure gas sensor set forth in claim 5 wherein
said first electro-fluidic delay line oscillator comprises a sealed tubing of predetermined length containing the known gaseous medium,
said second electro-fluidic delay line oscillator comprising a tubing of adjustable length provided with means for passage of the multi-gas mixture therethrough,
said first and second electro-fluidic delay line oscillators further comprising electrical-pneumatic transducer means at opposite ends of the tubings for converting the pneumatic signals to electrical signals of corresponding frequency at output ends of the tubings and for converting the electrical signals to pneumatic signals of corresponding frequency at input ends of the tubings, and
electronic amplifier means for providing sufficient gain in said first and second oscillators to maintain self-sustained oscillations therein.

7. The partial pressure gas sensor set forth in claim 6 wherein
the known gaseous medium contained within said sealed tubing is a single gas.

8. The partial gas sensor set forth in claim 6 wherein
the known gaseous medium contained within said sealed tubing is a multi-gas mixture different from the multi-gas mixture passing through said second oscillator tubing.

9. The partial pressure gas sensor set forth in claim 6 wherein
the known gaseous medium contained within said sealed tubing is a multi-gas mixture which is the same as the multi-gas mixture passing through said second oscillator tubing, the first gas and multi-gas mixture in said sealed tubing being of predetermined concentration corresponding to a reference condition for generating the reference frequency signal.

10. The partial pressure gas sensor set forth in claim 6 wherein
the multi-gas mixture passing through said second oscillator tubing includes two or more known gases wherein the gas constant of the first gas is different from the gas constants of the other gases in the mixture.

11. The partial pressure gas sensor set forth in claim 1 wherein
said difference frequency detecting means comprise an electronic beat frequency detector provided with inputs supplied with reference and second frequency signals in electrical form for generating a third frequency signal of frequency equal to any difference frequency between the reference and second frequency signals.

12. The partial pressure gas sensor set forth in claim 1 wherein
said difference frequency detecting means comprise a fluidic beat frequency detector provided with inputs supplied with the reference and second frequency signals in pneumatic form for generating a third frequency signal of frequency equal to any difference frequency between the reference and second frequency signals.

13. A partial pressure gas sensor comprising
a first electro-fluidic delay line oscillator having the delay line thereof comprising a sealed first tube of predetermined fixed length and filled with a first known gaseous medium to thereby generate a reference frequency signal of frequency dependent on the first tube length and gas constant of the first gaseous medium,
a second electro-fluidic delay line oscillator, said first and second oscillators immersed in a two-gas mixture, whereby said sensor is temperature insensitive, said second oscillator having the delay line thereof comprising a second tube of adjustable length and provided with means for passage of the two-gas mixture therethrough to thereby generate a second frequency signal of frequency dependent on the second tube length and an equivalent gas constant of the two-gas mixture, the ratio of the lengths of said first and second tubes corresponding to a particular value of partial pressure of a first gas in the two-gas mixture whereby the condition of equal frequencies of the reference and second frequency signals indicates the partial pressure of the first gas in the two-gas mixture is at the desired value determined by the particular length of said second tube and the condition of unequal frequencies indicates a deviation therefrom, and
a beat frequency detector provided with inputs supplied with the reference and second frequency signals to thereby generate a third frequency signal corresponding to any difference therebetween wherein the difference frequency is proportional to the deviation of the partial pressure of the first gas in the two-gas mixture from the desired value thereof.

14. The partial pressure gas sensor set forth in claim 13 wherein
said means for passage of the two-gas mixture through said second tube comprises apertures therein located near the ends thereof and further comprising
means for containing said first and second oscillators to maintain them immersed in the two-gas mixture.

15. The partial pressure gas sensor set forth in claim 14 and further comprising
first valve means for controlling a flow of the second gas of the two-gas mixture to said containing means, and
second valve means for automatically controlling a flow of the first gas of the two-gas mixture to said containing means as a function of the difference frequency at the output of said beat frequency detector to thereby obtain a system for controlling the partial pressure of the first gas at the desired value.

16. The partial pressure gas control system set forth in claim 15 wherein
said first valve means comprises a gas pressure regulator for controlling the pressure of the second gas in accordance with a known function of the sensor environment, and
said second valve means comprises a flow valve and a fluidic frequency-to-analog converter for converting the difference frequency signal at the output of said beat frequency detector to an analog pressure signal of magnitude directly proportional to the difference frequency, the output of said converter being provided to the control element of said flow valve for automatic control thereof.

17. The partial pressure gas control system set forth in claim 16 and further comprising
means for varying the length of said second tube in accordance with a known function of the sensor environment whereby in a change of the sensor environment from a first known condition to a second known condition the tube length is changed and a difference frequency generated which automatically controls said flow valve to vary the effective gas constant of the two-gas mixture and reduce the difference frequency to zero thereby controlling the partial pressure of the first gas at the same desired value at both the first and second known conditions of the sensor environment.

18. A partial pressure gas sensor comprising
first oscillator means for generating a reference frequency signal of frequency dependent on a parameter of a known gaseous mixture,
second oscillator means for generating a second frequency signal of frequency dependent on a parameter of a multi-gas mixture and the partial pressure of a first gas in the multi-gas mixture, said first and second oscillator means immersed in the multi-gas mixture whereby the sensor is compensated for variations in the frequency of the signals generated by said first and second oscillator means due to variations in said parameter of the multi-gas mixture, means for detecting any difference frequency between the reference and second frequency signals wherein the difference frequency is proportional to the deviation of the partial pressure of the first gas in the multi-gas mixture from a desired value thereof, and means for varying the frequency of said second oscillator means as a known function of the environmental condition of the multi-gas mixture.

* * * * *